US006609004B1

(12) United States Patent
Morse et al.

(10) Patent No.: US 6,609,004 B1
(45) Date of Patent: Aug. 19, 2003

(54) COMMUNICATION MANAGEMENT SYSTEM FOR PERSONALIZED MOBILITY MANAGEMENT OF WIRELESS SERVICES AND METHOD THEREFOR

(75) Inventors: Gary James Morse, Boca Raton, FL (US); Hagai Ohel, Coconut Creek, FL (US)

(73) Assignee: Motorola INC, Schaumburg, IL (US)

( * ) Notice: Subject to any disclaimer, the term of this patent is extended or adjusted under 35 U.S.C. 154(b) by 63 days.

(21) Appl. No.: 09/667,847

(22) Filed: Sep. 22, 2000

(51) Int. Cl.[7] .............................................. G06F 15/16
(52) U.S. Cl. ....................... 455/456; 455/414; 709/206; 709/208; 709/218
(58) Field of Search .............................. 455/456, 414; 701/206, 207, 208

(56) References Cited

U.S. PATENT DOCUMENTS

| | | | |
|---|---|---|---|
| 5,890,068 A | 3/1999 | Fattouche et al. | |
| 5,914,675 A | 6/1999 | Tognazzini | |
| 5,963,866 A | 10/1999 | Palamara et al. | |
| 6,026,304 A | 2/2000 | Hilsenrath et al. | |
| 6,058,175 A | 5/2000 | Schultz | |
| 6,108,533 A * | 8/2000 | Brohoff | 455/414 |
| 6,256,498 B1 * | 7/2001 | Ludwig | 455/433 |
| 6,338,020 B2 * | 1/2002 | Hashimoto | 340/988 |
| 6,343,317 B1 * | 1/2002 | Glorikian | 455/456 |
| 6,349,203 B1 * | 2/2002 | Asaoka et al. | 455/414 |
| 6,434,479 B1 * | 8/2002 | Kondou et al. | 701/203 |

* cited by examiner

Primary Examiner—Thanh Cong Le
Assistant Examiner—Alan T. Gantt
(74) Attorney, Agent, or Firm—Randi L. Dulaney

(57) ABSTRACT

A communication management system (48) for personalized mobility management of wireless services includes at least one wireless communication device (36), a mobility aware content server (50), and a wireless communication system (10). The mobility aware content server (50) sends a location specific content (60) to the wireless communication system (10) in response to a current location (62), a movement speed (64), and a movement direction (66) of the wireless communication device (36). The wireless communication system (10) is coupled to the mobility aware content server (50), and, upon receipt of the location specific content (60) from the mobility aware content server (50), transmits the location specific content (60) to the wireless communication device (36).

16 Claims, 8 Drawing Sheets

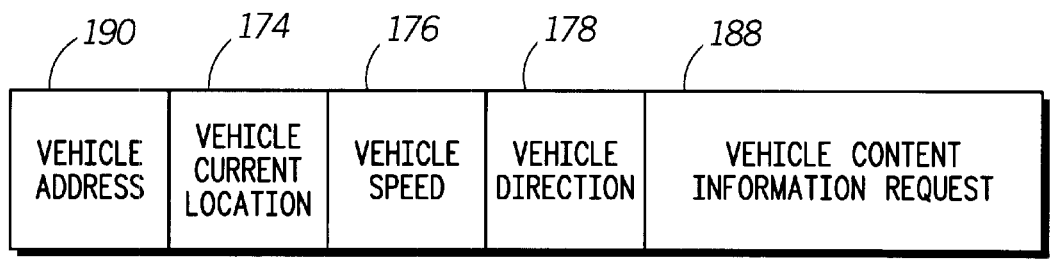
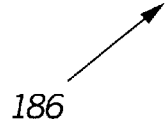
*FIG. 10*

COMMUNICATION MANAGEMENT SYSTEM FOR PERSONALIZED MOBILITY MANAGEMENT OF WIRELESS SERVICES AND METHOD THEREFOR

BACKGROUND OF THE INVENTION

1. Field of the Invention

This invention relates in general to wireless communication systems and in particular to wireless communication systems for personalized mobility management of wireless services.

2. Description of the Related Art

With the advent of information services for wireless communication devices such as one and two-way pagers and cellular telephones, a device user may carry a device capable of receiving and accessing a large volume of data. Additionally, with improved memory capability of the wireless communication devices, the device can store a large volume of messages.

It is useful in many wireless communication systems, for example paging and cellular systems, to know the location of the wireless communication devices that are operating within the wireless communication system. The location or position information of the wireless communication devices for example can be used for registration and directed delivery of messages to the wireless communication devices or to locate a device user in case of an emergency situation.

Conventional schemes for locating wireless communication devices determine only a current location for the wireless communication device. For example, a conventional wireless communication system can use direction-finding equipment at each base station site in order to fix the location of the wireless communication device. The current location is computed by triangulation when two or more transmitter base stations receive the same signal. The disadvantage to this system is that the wireless communication device is required to transmit for long time periods at high power levels in order to enable accurate measurements of angles by the transmitter base stations. Such high power and long duty cycle transmissions would not be effective for small wireless communication device applications such as two way pagers and cellular telephones due to the battery life loss.

As part of a wireless communication service, there are adjunct servers that provide information and other content services to device users that have their content configured according to personalized preferences, system generated information, and the wireless communication device generated information. Location based services are typically application limited due to the hardware, software, and networks required to support the ability to locate a mobile object and then communicate the unit's location back to a control point where the location information is utilized by a server. The server provides location based functions based on the needs of the particular application.

The most common location based applications prior to the integration of sophisticated location system data becoming available in wireless communication devices include vehicle fleet management (location of trucks, speed, direction, in/out of bounds, off route, traffic/accident avoidance, stolen vehicle recovery), asset tracking (used primarily for large freight containers, container location, customer delivery information), maps (a useful location based service is the delivery of maps for finding streets, addresses, businesses, location information is supplied by the system about the user's position and then this information is utilized to send the appropriate maps of the area), and localized information services (information services optimized for a location, cell or regional basis, cellular or paging, weather, traffic, events, now becoming specialized to restaurants, shopping, services).

Additionally, the recent introduction of content information services provides a new method of communicating a large amount of information to a large number of people at a relatively low cost. However, content information may be relevant only to a device user who either has entered or is about to enter a certain location, and not relevant when the user is located elsewhere.

What is needed is a wireless communication system and method for selecting relevant content information from the large amount of communicated content information on the basis of a future location of the device user. What is further needed is a system and method to dynamically update position and time information in order to make a judgment on the direction and speed of the mobility of the device user by sampling the position at different intervals. Once the system understands this location, speed and direction, its services can be tailored accordingly.

BRIEF DESCRIPTION OF THE SEVERAL VIEWS OF THE DRAWINGS

FIG. 10 illustrates a protocol for communication within the communication management system of FIG. 2 using the mobile vehicle of FIG. 9.

DETAILED DESCRIPTION OF THE INVENTION

Figure 1:
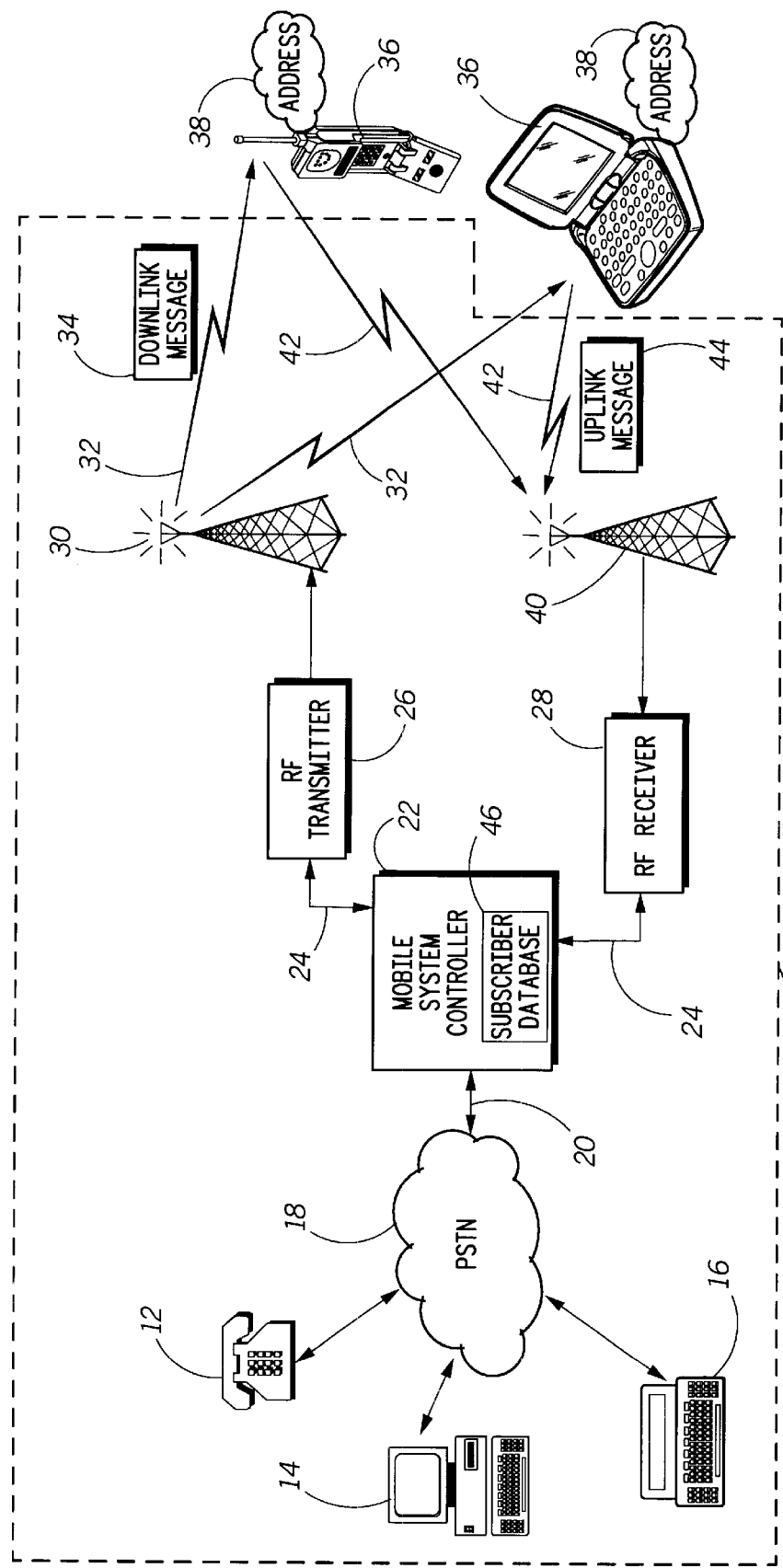
FIG. 1 is an electronic block diagram of a conventional wireless communication system.

Referring to FIG. 1, an electronic block diagram of a wireless communication system 10 is shown. The wireless communication system 10 comprises a message input device, such as a telephone 12, a computer 14, or a desktop messaging unit 16, connected through a conventional public switched telephone network (PSTN) 18 through a plurality of telephone links 20 to a mobile system controller 22. The telephone links 20 may be a plurality of twisted wire pairs, a fiber optic cable, or a multiplexed trunk line.

The mobile system controller 22 is coupled to and oversees the operation of at least one radio frequency (RF) transmitter 26 and at least one radio frequency (RF) receiver 28 through one or more communication links 24. The communication links 24 typically are twisted pair telephone wires, and additionally can include radio frequency (RF), microwave, or high quality audio communication links. The radio frequency transmitter 26 and the radio frequency receiver 28, which typically are used in message store and forward stations that encode and decode inbound and outbound messages into formats that are compatible with landline message switch computers and personal radio addressing requirements, such as cellular message protocols. The mobile system controller 22 can also function to encode and decode wireless messages that are transmitted to or received by the radio frequency transmitter 26 or the radio frequency receiver 28. Telephony signals are typically transmitted to and received from the mobile system controller 22 by telephone sets such as the telephone 12 or a wireless communication device 36. The mobile system controller 22 encodes and schedules outbound messages such as a downlink message 34, for transmission by the radio frequency transmitter 26 via a transmit antenna 30 to at least one wireless communication device 36 on at least one outbound radio frequency (RF) channel 32. As illustrated in FIG. 1, the wireless communication device 36 may be, for example, a cellular telephone or a two-way pager. The downlink message 34 may be, for example, a data message. Similarly, the mobile system controller 22 receives and decodes inbound messages such as an uplink message 44 received by the radio frequency receiver 28 via a receive antenna 40 on at least one inbound RF channel 42 from the wireless communication device 36. The uplink message 44 may be, for example, a data message or a reply to a data message.

It will be appreciated that the wireless communication system 10, in accordance with the present invention, may function utilizing any wireless RF channel, for example, a one or two-way pager channel, a mobile cellular channel, or a mobile radio channel. Similarly, it will be appreciated that the wireless communication system 10 may function utilizing other types of channels such as infrared channels. In the following description, the term wireless communication system refers to any of the wireless communication systems mentioned above or an equivalent.

Similarly, it will be appreciated that the wireless communication device 36, in accordance with the present invention, may be a mobile cellular telephone, a mobile radio data terminal, a mobile cellular telephone having an attached data terminal, or a two way pager. In the following description, the term "wireless communication device" refers to any of the devices mentioned above or an equivalent.

Each wireless communication device 36 assigned for use in the wireless communication system 10 has an address 38 assigned thereto which is a unique selective call address in the wireless communication system 10. The address 38 enables the transmission of the downlink message 34 from the mobile system controller 22 only to the wireless communication device 36 having that address 38, and identifies the messages and responses received at the mobile system controller 22 from the wireless communication device 36. In one embodiment, each wireless communication device 36 also has a pin number assigned thereto, the pin number being associated with a telephone number within the PSTN 18. A list of the assigned addresses and correlated telephone numbers for each wireless communication device 36 is stored in the mobile system controller 22 in the form of a subscriber database 46.

Figure 2:
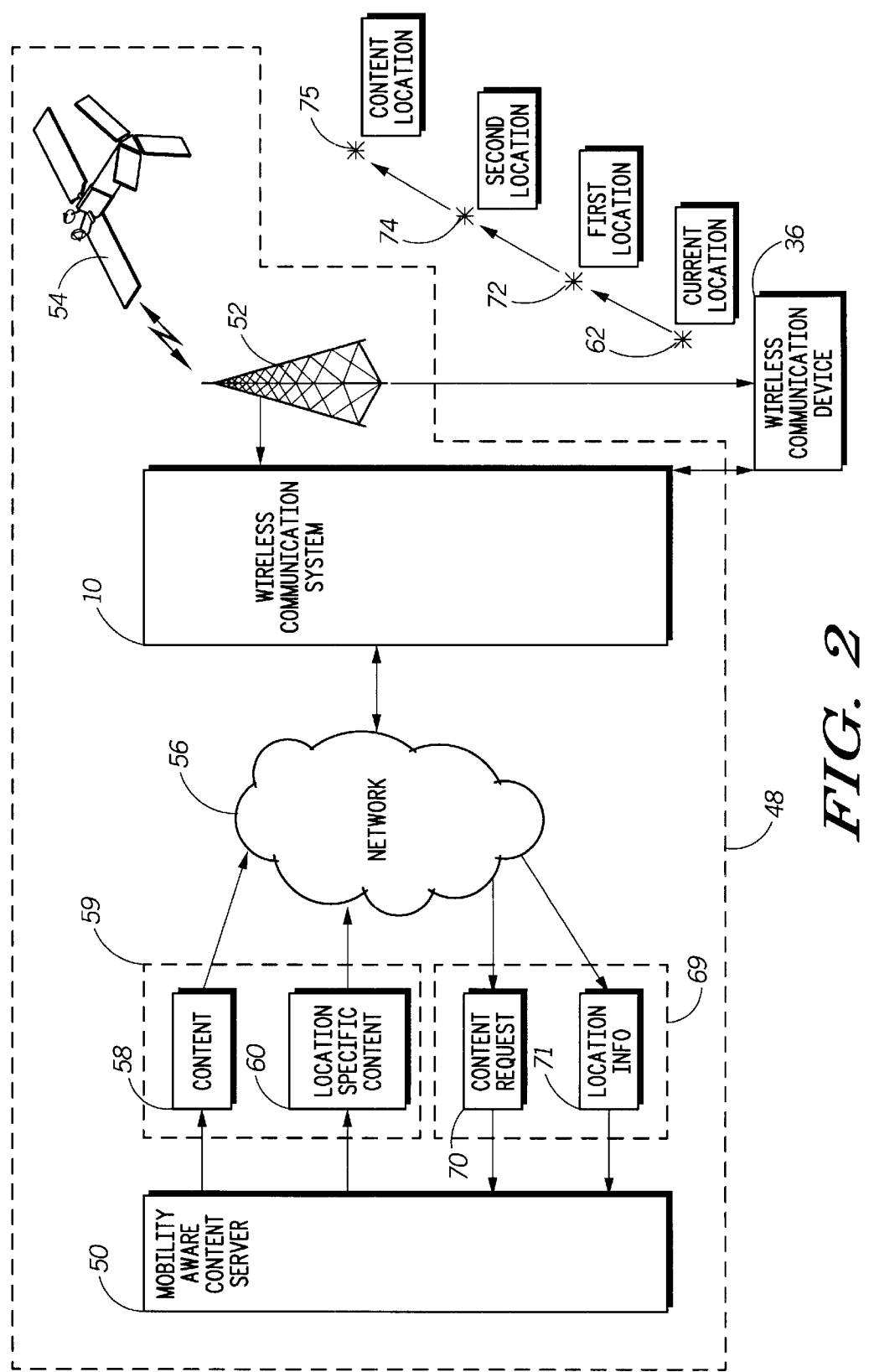
FIG. 2 is an electronic block diagram of a communication management system for personalized mobility management of wireless services in accordance with the present invention.

Referring to FIG. 2, an electronic block diagram of one embodiment of a communication management system 48 for personalized mobility management of wireless services in accordance with the present invention is shown. The communication management system 48, as illustrated in FIG. 2 includes the wireless communication system 10, a mobility aware content server 50, a radio tower 52, and a satellite 54.

As illustrated in FIG.2, the mobility aware content server 50 is coupled to the wireless communication system 10 via a network 56. The network 56, for example, can be a local area network or a wide area network. The mobility aware content server 50 controls and manages communication of a plurality of content information 58 to a plurality of wireless communication devices such as the wireless communication device 36 of FIG. 1. The mobility aware content server 50, determines a plurality of location specific content 60 to be sent to the wireless communication device 36 in response to a current location 62, a movement speed 64, and a movement direction 66 of movement of a device user 68 in possession of the wireless communication device 36 by sending the location specific content 60 through the wireless communication system 10 to the wireless communication device 36. The wireless communication system 10, upon receipt of the location specific content 60 from the mobility aware content server 50, transmits the location specific content 60 to the wireless communication device 36 preferably as the downlink message 34 via the outbound RF channel 32 as illustrated previously in FIG. 1. Further, the wireless communication system 10 communicates a server input 69 to the mobility aware content server 50 in response to an event. For example, the wireless communication system 10 can communicate a server input 69 that is a content request 70 to the mobility aware content server 50 in response to receipt of the uplink message 44 from the wireless communication device 36 including the content request 70. Similarly, the wireless communication system 10 can communicate a server input 69 that is a location information 71 in response to receipt of the uplink message 44 from the wireless communication device 36 including the location information 71.

The addition of the mobility aware content server 50 to the communication management system 48 enhances the operation of the communication management system 48 by adding intelligence including device location, movement speed, and movement direction for the management of location specific content to the wireless communication device 36.

The detection and notification of the current location 62, the movement direction 66, and the movement speed 64 of the wireless communication device 36 can be done by either the wireless communication device 36 itself, the wireless communication system 10, or the mobility aware content server 50 using information received from the radio tower 52. For example, in a wireless communication system using the ReFLEX protocol, each radio tower is assigned a 'Color Code', which is embedded in the frame synchronization word broadcasted to the plurality of wireless communication devices such as the wireless communication device 36. The wireless communication device 36 can determine its relative location by comparing the current color code against an earlier color code. Similarly, in the GSM protocol, the Base Identification Code (BSIC) broadcasted on the SCH of every cell allows a mobile station to distinguish among neighboring cells. The movement direction 66 and the movement speed 64 are calculated using a plurality of received location points such as a first location point 72 and a second location point 74.

Alternatively, the wireless communication system can use a very high-frequency omni directional range (VOR), which is used primarily as a navigation aid for aircraft compares the phase of a fixed and rotating signal to compute its angle with respect to a transmitter station. In a VOR system, a transmitter emits a (variable) modulation whose phase relative to a reference modulation is different for each bearing of the receiving point from the station. The typical radio frequency (RF) bandwidth required for a VOR system is around 25 kilohertz (KHz).

Alternatively, as illustrated in FIG. 2, the current location 62 of the wireless communication device 36 can be determined using the Global Positioning System (GPS). The Global Positioning System is a worldwide radio-navigation system formed from a constellation of 24 satellites and their ground stations. GPS uses these "man-made stars" as reference points to calculate positions accurate to a matter of meters. The satellites in space such as the satellite 54 are used as reference points for locations here on earth.

It will be appreciated by one of ordinary skill in the art that the communication management system 48, in accordance with the present invention, can determine the location of the plurality of wireless communication devices using the systems mentioned above or an equivalent.

Figure 3:
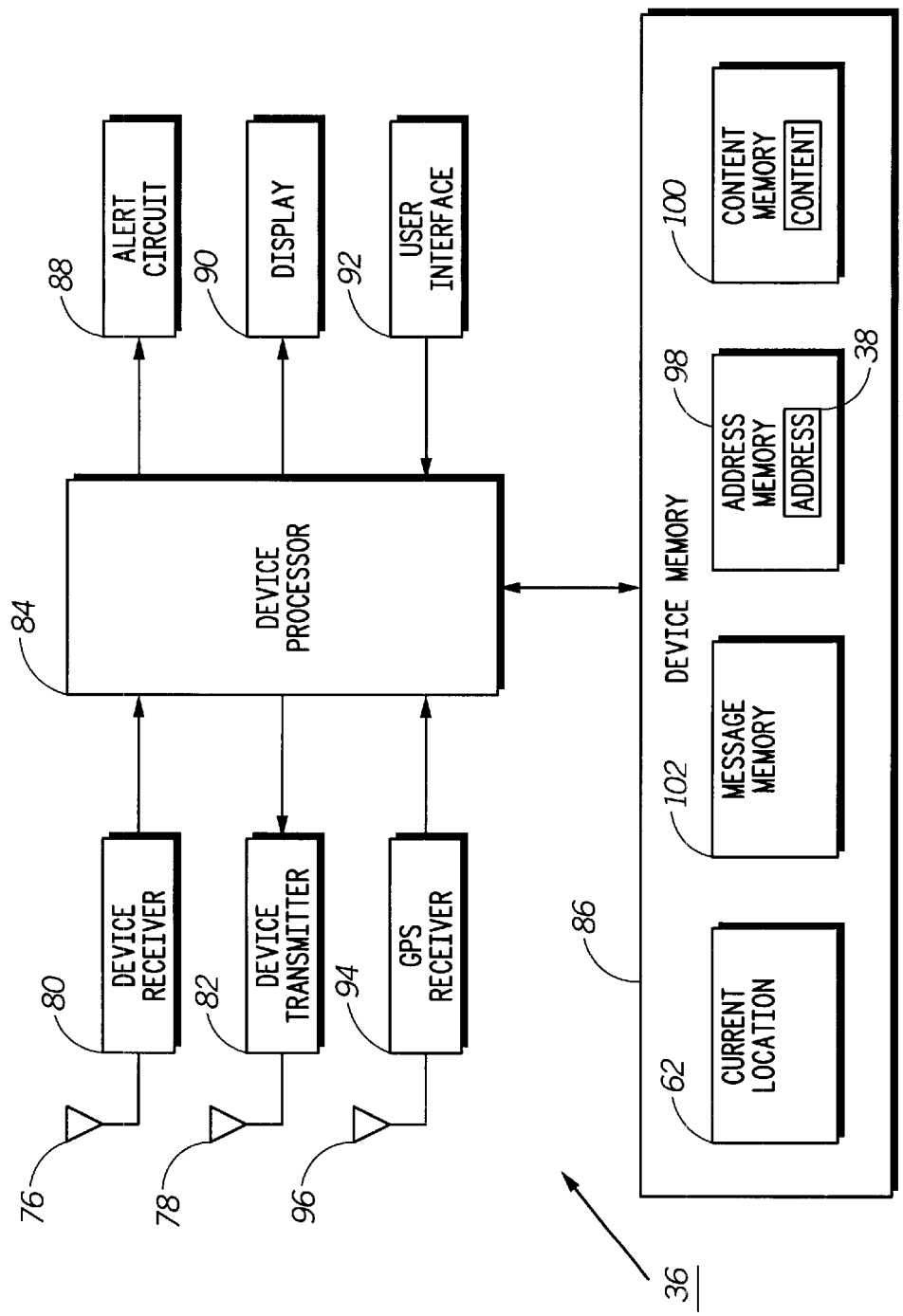
FIG. 3 is an electronic block diagram of a wireless communication device for use in the communication management system of FIG. 2.

FIG. 3 is an electronic block diagram of a preferred embodiment of the wireless communication device 36 for use within the communication management system 48 of FIG. 2. The wireless communication device 36 includes a first device antenna 76, a second device antenna 78, a device receiver 80, a device transmitter 82, a device processor 84, a device memory 86, an alert circuit 88, a display 90, a user interface 92, a global positioning satellite (GPS) receiver 94 and GPS antenna 96.

The first device antenna 76 intercepts transmitted signals from the wireless communication system 10. The first device antenna 76 is coupled to the device receiver 80, which employs conventional demodulation techniques for receiving the communication signals transmitted by the wireless communication system 10 such as the downlink message 34 of FIG. 1.

Coupled to the device receiver 80, is the device processor 84 utilizing conventional signal processing techniques for processing received messages. Preferably, the device processor 84 is similar to the MC68328 micro-controller manufactured by Motorola, Inc. of Schaumburg, Ill. It will be appreciated by one of ordinary skill in the art that other similar processors can be utilized for the device processor 84, and that additional processors of the same or alternative type can be utilized as required to handle the processing requirements of the device processor 84.

The device processor 84 decodes an address in the demodulated data of the received message, compares the decoded address with one or more addresses such as the address 38 stored in an address memory 98 of the device memory 86; and when a match is detected, proceeds to process the remaining portion of the received message.

To perform the necessary functions of the wireless communication device 6, the device processor 84 is coupled to the device memory 86, which preferably includes a random access memory (RAM), a read-only memory (ROM), and an electrically erasable programmable read-only memory (EEPROM)(not shown). The device memory 86 also includes the address memory 98, a content memory 100 and a message memory 102.

Once the device processor 84 has processed a received message, it stores the decoded message in the message memory 102. It will be appreciated by one of ordinary skill in the art that the message memory 102, in accordance with the present invention, can be a voicemail box or a group of memory locations in a data storage device. In the following description, the term "message memory" refers to any of the memory means mentioned above or an equivalent.

Upon receipt and processing of a message, the device processor 84 preferably generates a command signal to the alert circuit 88 to notify the device user 68 (see FIG. 2) that the message has been received and stored. The alert circuit 88 can include a speaker (not shown) with associated speaker drive circuitry capable of playing melodies and other audible alerts, a vibrator (not shown) with associated vibrator drive circuitry capable of producing a physical vibration, or one or more LEDs (not shown) with associated LED drive circuitry capable of producing a visual alert. It will be appreciated by one of ordinary skill in the art that other similar alerting means as well as any combination of the audible, vibratory, and visual alert outputs described can be used for the alert circuit 88.

Upon receipt of a message, the device processor 84 preferably also generates a command signal to the display 90 to generate a visual notification of the receipt and storage of the message. When the display 90 receives the command signal from the device processor 84 that the message has been received and stored in the message memory 102, a message indication is displayed. The message indication, for example can be the activation of one of a plurality of message icons on the display 90. The display 90 can be, for example, a liquid crystal display utilized to display text. It will be appreciated by one of ordinary skill in the art that other similar displays such as dot matrix displays can be utilized for the display 90.

Preferably, the user interface 92 is coupled to the device processor 84, as shown in FIG. 3. The user interface 92 can be one or more buttons used to generate a button press, a series of button presses, a voice response from the device user 68, or some other similar method of manual response initiated by the device user 68 of the wireless communication device 36. The device processor 84 is responsive to commands generated by the device user 68 via the user interface 92.

The device transmitter 82 is coupled to the device processor 84 and is responsive to commands from the device processor 84. When the device transmitter 82 receives a command from the device processor 84, the device transmitter 82 sends a signal such as the uplink message 44 via the second device antenna 78 to the wireless communication system 10.

In an alternative embodiment, the wireless communication device 36 includes one antenna performing the functionality of the first device antenna 76 and the second device antenna 78. Further, the wireless communication device 36 alternatively includes a transceiver circuit performing the functionality of the device receiver 80 and the device transmitter 82. It will be appreciated by one of ordinary skill in the art that other similar electronic block diagrams of the same or alternate type can be utilized for the wireless communication device 36 to handle the requirements of the wireless communication device 36.

The wireless communication device 36 of FIG. 3 preferably includes the GPS receiver 94 and GPS antenna 96. The GPS receiver 94 uses the satellites in space as reference points for locations here on earth. The GPS receiver 94 measures distance using the travel time of radio signals. The GPS receiver 94 has very accurate timing to measure travel time. Along with distance, the GPS receiver 94 knows exactly where the satellites are in space. Finally the GPS receiver 94 corrects for any delays the signal experiences as it travels through the atmosphere.

The GPS receiver 94 receives a plurality of signals via the GPS antenna 96 corresponding to the current location 62. Preferably, the current location 62, determined from the processing of the plurality of signals, is stored in the device memory 86 for later use. The GPS receiver 94 provides an accurate method for the wireless communication device 36 to determine its current location 62.

Figure 4:
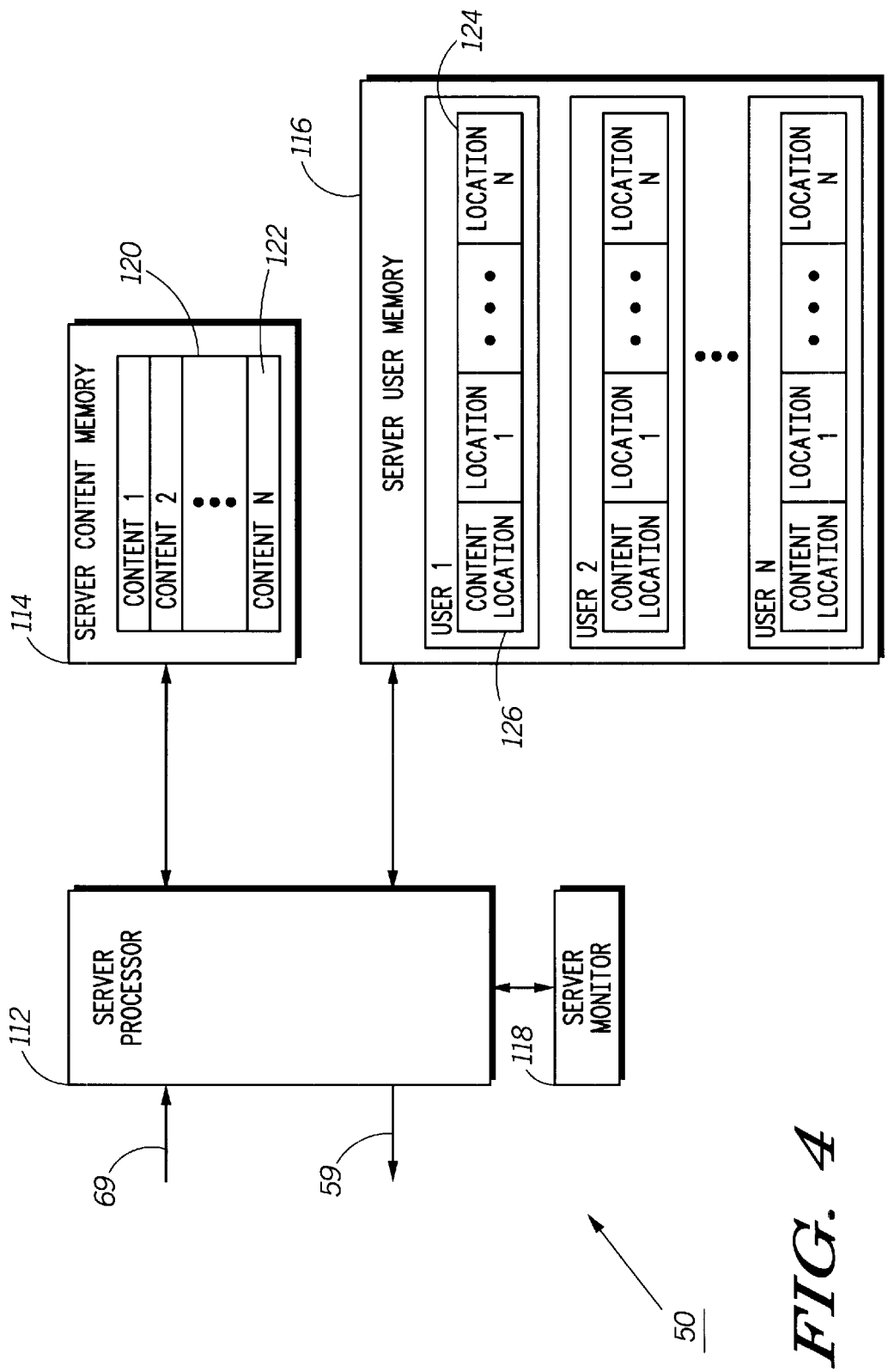
FIG. 4 is an electronic block diagram of a mobility aware content server for use in the communication management system of FIG. 2.

FIG. 4 is an electronic block diagram of a preferred embodiment of the mobility aware content server 50 for use in the communication management system of FIG. 2. The mobility aware content server 50 includes a server processor 112, a server content memory 114, a server user memory 116 and a server monitor 118.

The first server antenna 104 The first server antenna 104 is coupled to the server receiver 106, which employs conventional demodulation techniques for receiving the communication signals transmitted by the wireless communication system 10 such as the content request 70.

The server processor 112 intercepts signals such as the server input 69, which can be for example the content request 70 or the location information 71, from the wireless communication system 10 received via the network 56. The server processor 112 also sends the content information 58 such as the location specific content 60 to the wireless communication system 10 via the network 56.

The server processor 112 utilizes conventional signal-processing techniques for processing received content requests. Preferably, the server processor 112 is similar to the MC68328 micro-controller manufactured by Motorola, Inc. of Schaumburg, Ill. It will be appreciated that other similar processors can be utilized for the server processor 112, and that additional processors of the same or alternative type can be added as required to handle the processing requirements of the server processor 112. The server processor 112 receives the content request 70 from the server receiver 106 and processes that request to generate the location specific content 60.

To perform the necessary functions of the mobility aware content server 50, the server processor 112 is coupled to the server content memory 114, which preferably includes a random access memory (RAM), a read-only memory (ROM), and an electrically erasable programmable read-only memory (EEPROM). The server content memory 114 preferably stores a plurality of content information 120 including the content information 122. The content information 122 is location specific and can be, for example local restaurants, local movies, local stores, or local weather. In the following description, the term content information refers to any of the content information mentioned above or an equivalent.

To perform the necessary functions of the mobility aware content server 50, the server processor 112 is further coupled to the server user memory 116, which preferably includes a random access memory (RAM), a read-only memory (ROM), and an electrically erasable programmable read-only memory (EEPROM). The server user memory 116 preferably stores location information for a plurality of device users. For example, the server user memory 116 stores a plurality of locations 124 for a first user. The server processor 112 is programmed to calculate a first user content location 126 using the plurality of locations 124 for the first user. The first user content location 126 is then stored in the server user memory 116 for later use by the mobility aware content server 50 to determine the location specific content 60 to send in response to a content request by matching the first user content location 126 with the plurality of content information 120.

The server processor 112 is coupled to the server monitor 118. The server monitor 118 performs various functions relating to the plurality of content information 120. The server monitor 118 is preferably programmed with a set of rules regarding the substance of content information. The server monitor 118, for example, may delete content information substance containing obscenity. The server monitor 118 may also disallow the creation of a new content containing obscenity. The server monitor 118 preferably also tracks traffic from a particular requester or group for billing purposes. Various billing methods are supported for the various types of content information. A flat rate per month, for example, may be charged to allow the device user 68 to pick a certain number of content information to subscribe to continuously or as desired. Alternatively, hourly charges or per character charges may be applied to requested content information. One skilled in the art will recognize that the mobility aware content server 50 in accordance with the present invention supports any of the billing methods mentioned above or an equivalent.

Figure 5:
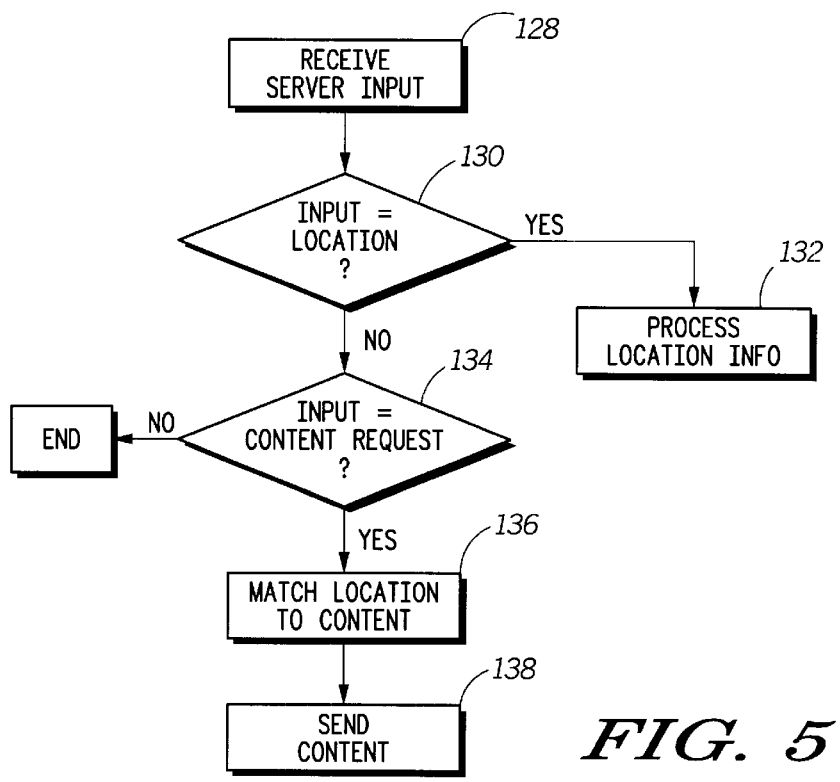
FIG. 5 is a flowchart illustrating the operation of the mobility aware content server of FIG. 4 in accordance with the present invention.

FIG. 5 is a flowchart illustrating the operation of the mobility aware content server 50 of FIG. 4 in accordance with the present invention. In Step 128, the mobility aware content server 50 receives the server input 69 from the wireless communication system 10. Preferably, the first server antenna 104 of the mobility aware content server 50 the server input 69 transmitted from the wireless communication system 10 over the network 56. Next, in Step 130 the mobility aware content server 50 analyzes the server input 69 and determines if the server input 69 is the location information 71. Preferably, the server receiver 106 demodulates the server input 69 using conventional demodulation techniques. The demodulated signal from the server receiver 106 is then processed by the server processor 112 using conventional signal-processing techniques. In Step 132, when the server input 69 is the location information 71, the mobility aware content server 50 processes the location information 71. Preferably, the server processor 112 stores the location information 71 in the server user memory 116 for the device user associated with the location information 71. For example, the server user memory 116 stores a plurality of locations 124 for a first user. The server processor 112 is programmed to calculate a first user content location 126 using the plurality of locations 124 for the first user. The first user content location 126 is then stored in the server user memory 116 for later use by the mobility aware content server 50 to determine the location specific content 60 to send in response to a content request by matching the first user content location 126 with the plurality of content information 120.

In Step 134, when the server input 69 is not the location information 71, the mobility aware content server 50 determines if the server input 69 is the content request 70. Preferably, the demodulated signal from the server receiver 106 is then processed by the server processor 112 using conventional signal-processing techniques to determine if the server input 69 is the content request 70. When the server input 69 is not the content request 70 the process ends. In Step 136, when the server input 69 is the content request 70, the mobility aware content server 50 processes the content request 70 by matching the location to the content. Preferably, the server processor 112 determines the required content information 122 for the device user originating the content request 70. The server processor 112 accesses the server content memory 114 to obtain the content information 58 which is preferably the location specific content 60, for example local restaurants, local movies, local stores, or local weather. In Step 138, the mobility aware content server 50 sends the location specific content 60. The server transmitter 110 receives a command from the server processor 112 including the content information 58 such as the location specific content 60. When the server transmitter 110 receives the command from the server processor 112, the server transmitter 110 sends the content information 58 such as the location specific content 60 via the second server antenna 108 to the wireless communication system 10.

Figure 6:
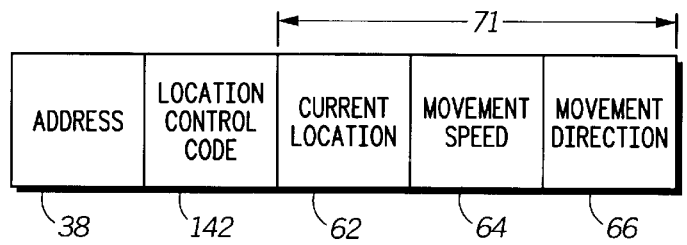
FIGS. 6 and 7 illustrates various protocols for communication within the communication management system of FIG. 2.

FIG. 6 illustrates one embodiment of a location protocol 140 for use in the communication of location information between the wireless communication device 36, the wireless communication system 10, and the mobility aware content server 50. The location protocol 140 is embedded within the uplink message 44 sent from the wireless communication device 36 to the wireless communication system 10 via the inbound RF channel 42. (see FIG. 1) The location protocol 140 is further embedded within the server input 69 sent from the wireless communication system 10 to the mobility content aware server 50 via the network 56. (see FIG. 2)

The location protocol 140 of FIG. 6 preferably includes the address 38, a location control code 142, and the location information 71. The address 38 is a unique selective call address assigned to the wireless communication device 36 in the wireless communication system 10. The address 38 identifies the messages and responses received at the mobile system controller 22 from the wireless communication device 36. The location control code 142 is a unique control code indicating that the location information 71 for the wireless communication device 36 follows. Preferably, as illustrated in FIG. 6, the location information 71 includes the current location 62, the movement speed 64, and the movement direction 66. The location protocol 140 facilitates the communication of location and movement information between the wireless communication device 36, the wireless communication system 10 and the mobility aware content server 50, thereby enabling the calculation of a future location of the wireless communication device 36 by the mobility aware content server 50.

Figure 7:
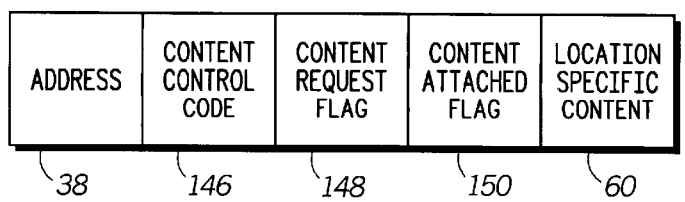

FIG. 7 illustrates one embodiment of a content protocol 144 for use in the communication of the location specific content 60 between the wireless communication device 36, the wireless communication system 10, and the mobility aware content server 50. The content protocol 144 is embedded within the downlink message 34 sent to the wireless communication device 36 from the wireless communication system 10 via the outbound RF channel 32. (see FIG. 1) The content protocol 144 is further embedded within the server output 59 sent to the wireless communication system 10 from the mobility content aware server 50 via the network 56. (see FIG. 2)

The content protocol 144 of FIG. 7 preferably includes the address 38, a content control code 146, a content request flag 148, a content attached flag 150, and the location specific content 60. The address 38 is a unique selective call address assigned to the wireless communication device 36 in the wireless communication system 10. The address 38 enables the transmission of the downlink message 34 from the mobile system controller 22 only to the wireless communication device 36 having that address 38. The address 38 further identifies the messages and responses received at the mobile system controller 22 from the wireless communication device 36. The content control code 146 is a unique control code indicating that the message being communicated relates to content information for the wireless communication device 36.

The content request flag 148 identifies that a request for content information has been enabled. For example, the content request flag 148 can be set to "on" when the content request 70 is sent from the wireless communication device 36 to the wireless communication system 10 within the uplink message 44. (see FIG. 1). Further, the content request flag 148 can be set to "on" when the content request 70 is sent from the wireless communication system 10 to the mobility aware content server 50 within the server input 69. The content request flag 148 can be set to "off" when the message does not include a content request.

The content attached flag 150 identifies that the location specific content 60 follows in the message. For example, the content attached flag 150 can be set to "on" when the content protocol 144 is within the server output 59 sent from the mobility aware content server 50 to the wireless communication system 10 via the network 56 (see FIG. 2). Further, the content attached flag 150 can be set to "on" when the content protocol 144 is within the downlink message 34 sent from the wireless communication system 10 to the wireless communication device 36 via the outbound RF channel 32. (see FIG. 1)

Figure 8:
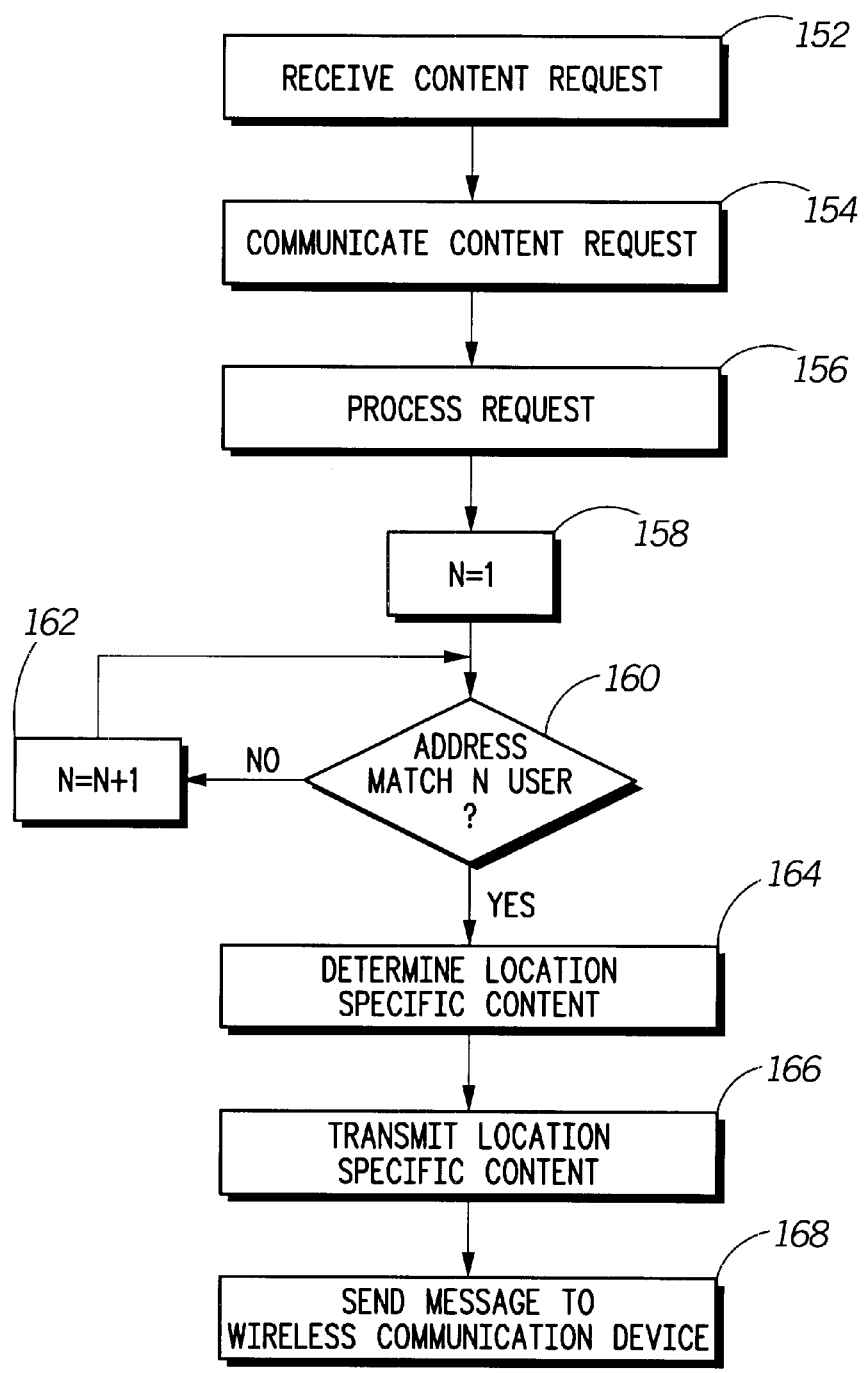
FIG. 8 is a flowchart illustrating one embodiment of the operation of the communication management system of FIG. 2.

FIG. 8 is a flowchart illustrating one method for the communication of the content request 70 and responding communication of the location specific content 60 between the wireless communication device 36 and the mobility aware content server 50. In FIG. 8, the content protocol 144 of FIG. 7 is utilized for communication of the location specific content 60. In Step 152, the mobile system controller 22 of the wireless on-call communication system 10 (see FIG. 1) receives the content request 70 for location specific content 60. The device user via the wireless communication device 36 can initiate the content request 70. The mobile system controller 22 of the wireless communication system 10 receives and decodes the content request 70 such as the uplink message 44 received by the radio frequency receiver 28 via the receive antenna 40 on at least one inbound RF channel 42 from the wireless communication device 36. Alternatively, the device user can initiate the content request 70 via a message input device such as the telephone 12, the computer 14, or the desktop messaging unit 16. The request is communicated through the PSTN 18 through the plurality of telephone links 20 to the mobile system controller 22.

In Step 154, the mobile system controller 22 communicates the content request 70 via the network 56 to the mobility aware content server 50. In Step 156, the mobility aware content server 50 processes the content request 70. The server receiver 106 demodulates the content request 70. Next, the server processor 112 processes the received content request. Next, in Step 158, the server processor 112 determines the user identification such as the first user by processing the address 38 through a database lookup. In Step 158, a counter is set to N=1. Next, in Step 160, the server processor 112 compares the address 38 received within the content protocol 144 with the Nth user address. In Step 162, when the address 38 does not match the address of the Nth user, the counter is incremented to N=N+1 and returns to Step 160 to continue checking for a match between the received address and the address of the Nth user. In Step 164, when the received address matches the address of the Nth user, the server processor 112 determines the location specific content 60 to send in response to the content request by matching the Nth user content location 126 with the plurality of content information 120 contained within the content memory 114. Next, in Step 166, the server transmitter 110 sends the location specific content 60 via the second server antenna 108 to the wireless communication system 10 in response to a command from the server processor 112. In Step 168, the mobile system controller 22 transmits the location based content 60 within the content protocol 144 using a downlink message 34 to the wireless communication device 36.

Figure 9:
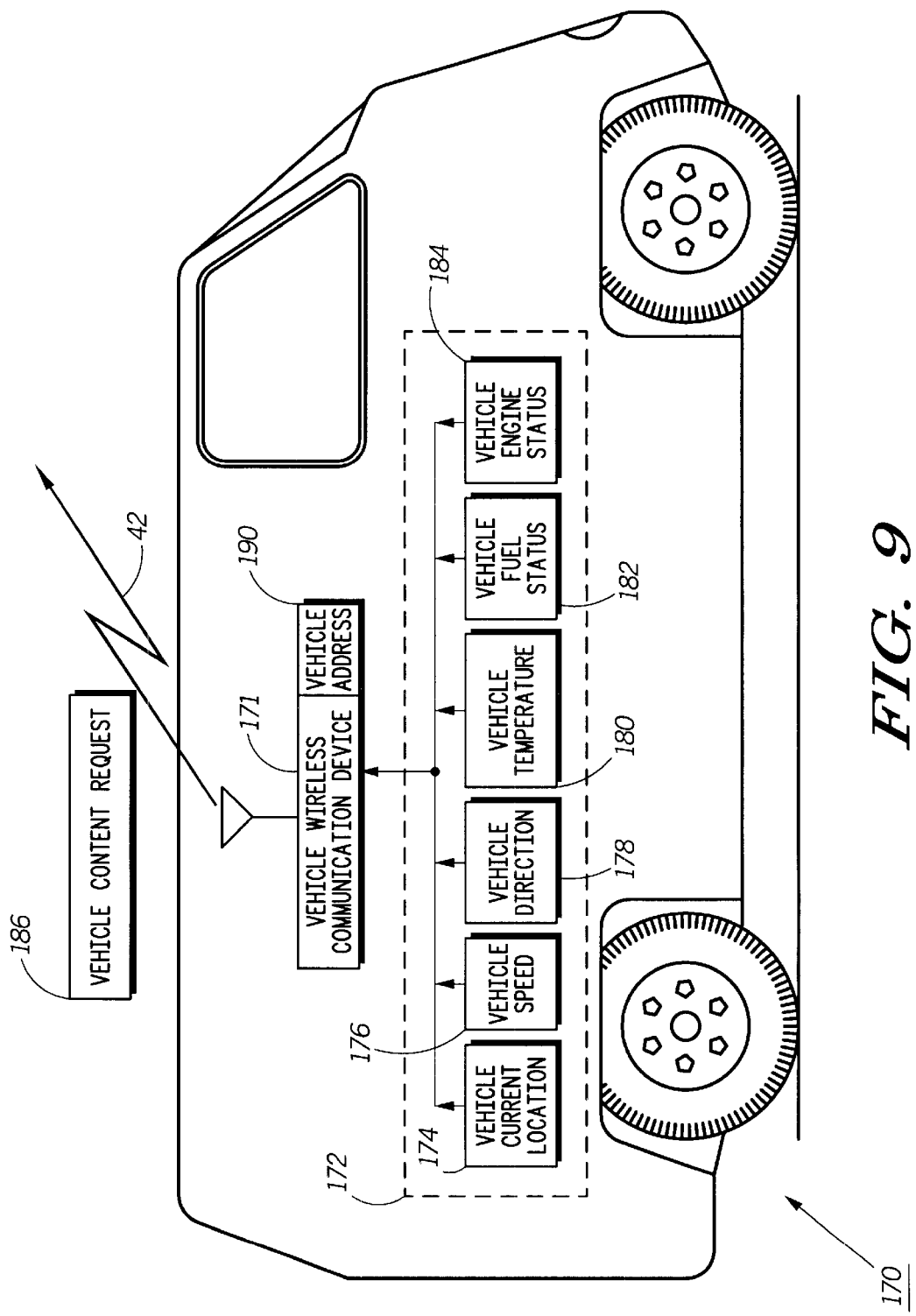
FIG. 9 illustrates a mobile vehicle for use within the communication management system of FIG. 2.

FIG. 9 illustrates one example of the utilization of the present invention. In FIG. 9, the wireless communication device 36 such as a vehicle wireless communication device 171 is connected within a mobile vehicle 170. The mobile vehicle 170 includes a vehicle address 190 which is a unique selective call address in the wireless communication system 10. The mobile vehicle 170 includes a plurality of vehicle status indicators 172 coupled to the wireless communication device 36. The plurality of vehicle status indicators 172 can include, for example, a vehicle current location 174, a vehicle speed 176, a vehicle direction 178, a vehicle temperature 180, a vehicle fuel status 182, and a vehicle engine status 184. The vehicle wireless communication device 171 periodically checks each of the plurality of vehicle status indicator 172. The vehicle wireless communication device 171 analyzes the plurality of vehicle status indicators 172 and responds thereto dependent upon the information received. For example, when the vehicle fuel status 182 is low, the wireless communication device 171 can respond thereto by transmitting a vehicle content request 186 via the inbound RF channel 42 to the wireless communication system 10, wherein the wireless communication system 10 then sends the vehicle content request 186 to the mobility aware content server 50 via the network 56.

FIG. 10 illustrates one embodiment of the vehicle content request 186. As illustrated in FIG. 10, the vehicle content request 186 can include the vehicle address 190, the vehicle current location 174, the vehicle speed 176, the vehicle direction 178, and the vehicle content information request 188 wherein the vehicle content information request 188 can be a request for the location of a gas station along the route of the mobile vehicle 170. The mobility aware content server 50 then transmits to the mobile vehicle 170 a message including the location specific content 60 that can be the gas stations corresponding to the vehicle current location 174, the vehicle speed 176, and the vehicle direction 178. Similarly, the vehicle wireless communication device 171 can transmit the vehicle content request 186 in response to the vehicle temperature 180 being too high or the vehicle engine status 184 indicating a problem with the engine. The location specific content 60 sent from the mobility aware content server 50 can include the location of a repair station based on the vehicle current location 174, the vehicle speed 176, and the vehicle direction 178. One skilled in the art will recognize that the vehicle wireless communication device 171 and the mobility aware content server 50 in accordance with the present invention supports the analysis and communication of associated location specific content for any of the vehicle status indicators as described above or an equivalent.

Although the invention has been described in terms of preferred embodiments, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. A communication management system for personalized mobility management of wireless services, wherein the communication management system, comprises:

at least one wireless communication device;

a radio tower for determining and communicating a plurality of location information including a current location, a movement speed, and a movement direction of the wireless communication device;

a mobility aware content server, wherein the mobility aware content server sends a location specific content to a wireless communication system in response to receiving from the radio tower the current location, the movement speed, and the movement direction of the wireless communication device; and the wireless communication system, coupled to the mobility aware content server, wherein the wireless communication system, upon receipt of the location specific content from the mobility aware content server, transmits the location specific content to the wireless communication device.

2. A communication management system for personalized mobility management of wireless services as recited in claim 1, wherein the wireless communication device comprises:

a first device antenna, wherein the first device antenna receives a message from the wireless communication system;

a device receiver coupled to the first device antenna for receiving the communication signals transmitted by the wireless communication system;

a device processor coupled to the device receiver, for processing received messages;

a device memory coupled to the device processor, wherein the device processor stores the message in the device memory;

a device transmitter coupled to the device processor, wherein the device transmitter sends a signal such as an uplink message in response to a command from the device processor.

3. A communication management system for personalized mobility management of wireless services as recited in claim 2, wherein the wireless communication device further comprises:

a global positioning satellite antenna; and a global positioning satellite receiver coupled to the global positioning satellite antenna, wherein the global positioning satellite receiver receives a plurality of signals via the GPS antenna corresponding to a current location of the wireless communication device.

4. A communication management system for personalized mobility management of wireless services as recited in claim 1, wherein the mobility aware content server comprises:

a first server antenna, wherein the first server antenna receives a server input from the wireless communication system;

a server receiver coupled to the first server antenna, wherein the server receiver demodulates the received server input;

a server processor coupled to the server receiver for processing the received server input;

a server content memory coupled to the server processor, for storing a plurality of content information including a location specific content information;

a server user memory coupled to the server processor, for storing a location information for a plurality of device users, wherein the server processor is programmed to calculate a first user content location using the plurality of locations for a first user, and further wherein the first user content location is stored in the server user memory, and further wherein the server processor determines the location specific content to send in response to a content request by matching the first user content location with the plurality of content information;

a second server antenna; and a server transmitter coupled to the second server antenna and further coupled to the server processor, for sending the location specific content via the second server antenna to the wireless communication device in response to a command from the server processor.

5. Within a communication management system, a method for personalized mobility management of wireless services comprising:

within a radio tower:
determining a plurality of location information for a first user; and
communicating the plurality of location information for the first user;

within a mobility content server:
receiving a server input including the location information for the first user from the radio tower;
storing the location information for the first user in one of a plurality of locations for the first user in a user memory;
calculating a first user content location using the plurality of locations for the first user;
storing the first user content location in the user memory; and
identifying one or more location specific content associated with the first user in response to a content request from the first user by matching the first user content location with a plurality of content information stored in a content memory.

6. Within a communication management system, a method for personalized mobility management of wireless services comprising:

within a wireless communication system:
initiating a content request from a device user using a message input device; and
communicating a server input including the content request via a network; and within a mobility content server:
receiving the server input including the content request;
identifying a required content information for the device user;
accessing a server content memory to obtain the content information which is preferably a location specific content; and
sending the content information such as the location specific content to the wireless communication system.

7. A communication management system for personalized mobility management of wireless services as recited in claim 1, wherein the radio tower sends the plurality of location information to the mobility aware content server using a location protocol, and further wherein the location protocol comprises:

an address, wherein the address is a unique selective call address assigned to the wireless communication device in the wireless communication system; and a location control code, wherein the location control code is a unique control code indicating that the plurality of location information for the wireless communication device follows.

8. A communication management system for personalized mobility management of wireless services as recited in claim 1, wherein the mobility aware content server sends the location specific content using a content protocol, and further wherein the content protocol comprises:

an address, wherein the address is a unique selective call address assigned to the wireless communication device in the wireless communication system;

a content control code, wherein the content control code is a unique control code indicating that the message being communicated relates to a location specific content for the wireless communication device;

a content request flag, wherein the content request flag identifies that a request for content information has been enabled;

a content attached flag, wherein the content attached flag identifies that the location specific content follows in the message; and the location specific content.

9. A mobile vehicle for use within a communication management system for personalized mobility management of wireless services, the mobile vehicle comprising:

a vehicle wireless communication device, wherein the vehicle wireless communication device transmits a plurality of locations via a wireless communication system to a mobility aware content server;

a vehicle address, wherein the vehicle address is a unique selective call address in the wireless communication system;

a plurality of vehicle status indicators coupled to the wireless communication device, wherein the vehicle wireless communication device analyzes the plurality of vehicle status indicators and responds thereto by transmitting a message including a vehicle content request to the mobility aware content server, and further wherein the vehicle wireless communication device receives one or more location specific content associated with the plurality of vehicle status indicators and the plurality of locations from the mobility content aware server in response to transmitting the vehicle content request.

10. A mobile vehicle as recited in claim 9, wherein the plurality of vehicle status indicators includes a vehicle current location.

11. A mobile vehicle as recited in claim 9, wherein the plurality of vehicle status indicators includes a vehicle speed.

12. A mobile vehicle as recited in claim 9, wherein the plurality of vehicle status indicators includes a vehicle direction.

13. A mobile vehicle as recited in claim 9, wherein the plurality of vehicle status indicators includes a vehicle temperature.

14. A mobile vehicle as recited in claim 9, wherein the plurality of vehicle status indicators includes a vehicle fuel status.

15. A mobile vehicle as recited in claim 9, wherein the plurality of vehicle status indicators includes a vehicle engine status.

16. A mobile vehicle for use within a communication management system for personalized mobility management of wireless services as recited in claim 9, wherein the vehicle content request comprises:

the vehicle address;

a vehicle current location;

a vehicle speed;

a vehicle direction; and a vehicle content information request, wherein the location specific content received by the vehicle wireless communication device from the mobility aware content server is further associated with the vehicle current location, the vehicle speed, and the vehicle direction.

* * * * *